(12) United States Patent
Chen

(10) Patent No.: US 6,582,074 B1
(45) Date of Patent: Jun. 24, 2003

(54) NOSE PAD FOR GLASSES

(75) Inventor: Jimmy Chen, Taipei (TW)

(73) Assignee: Aswan International Corp., Taipei (TW)

( * ) Notice: Subject to any disclaimer, the term of this patent is extended or adjusted under 35 U.S.C. 154(b) by 0 days.

(21) Appl. No.: 10/118,908

(22) Filed: Apr. 10, 2002

(51) Int. Cl.$^7$ ................................................ G02C 5/12
(52) U.S. Cl. ........................................ 351/136; 351/137
(58) Field of Search ................................ 351/136, 137, 351/138, 78, 79, 80, 81

(56) References Cited

U.S. PATENT DOCUMENTS 5,526,070 A * 6/1996 Simioni ....................... 351/138
6,422,699 B2 * 7/2002 Kobayashi .................. 351/136

* cited by examiner

*Primary Examiner*—Huy Mai
(74) *Attorney, Agent, or Firm*—Birch, Stewart, Kolasch & Birch, LLP

(57) ABSTRACT

A nose pad for glasses includes a frame, a fixing seat set under an arch of the frame, insertion posts with one end fastened onto the fixing seat and the other end bent downwardly and vertically to get connection to the nose pad. A soft nose pad in the shape of Ω forms a relatively thick arched member at each side. At the outer, lateral side of the arched member set an upper projection and a lower projection. The upper projection has a vertical through hole. The lower projection has a positioning groove with its opening facing upward. The nose pad is installed by passing through the insertion posts to the vertical through hole in the upper projection and fastening the ends of the insertion posts onto the positioning groove in the lower projection.

5 Claims, 5 Drawing Sheets

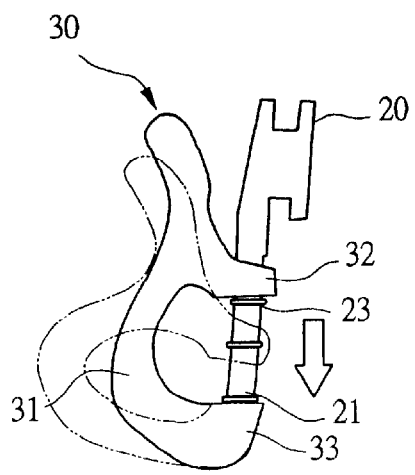
FIG.3
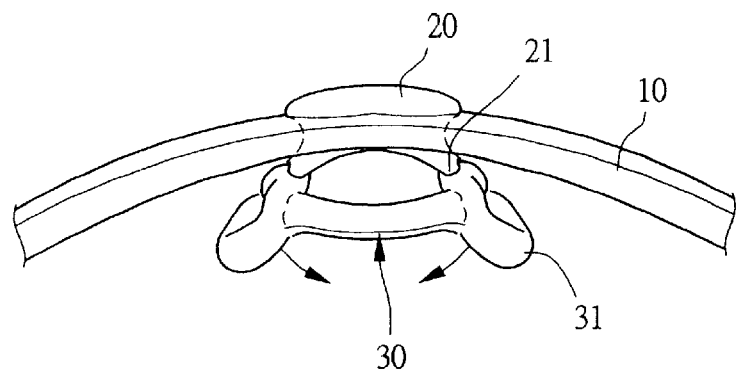
FIG.4-A
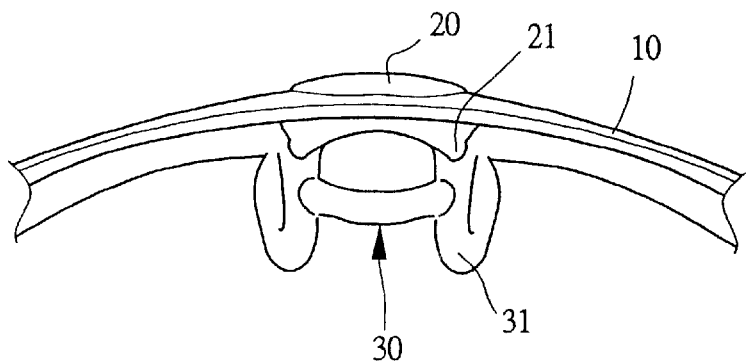
FIG.4-B

NOSE PAD FOR GLASSES

BACKGROUND OF THE INVENTION

I. Field of the Invention

This invention relates generally to an enhanced structure of nose pad for glasses and, more specifically, to glasses which provide an adjustable nose pad to fit the various sizes and shapes of wearers' noses and thus enhance physical comfort as well as safety for wearers.

II. Description of the Prior Art

Heretofore, it is known to construct glasses specially designed for protection from dust and glare. Glasses of such construction are required for people having to work in an environment with threat of dust and glare. Nonetheless, glasses of this kind are typically made in one size and of stiff material, not flexible enough to fit the needs of wearers with different contours and sizes of nose. The discomfort from wearing glasses often has to do with the nose pad positioned under the arch of the frame. Glasses with a fixed nose pad cannot provide comfortable wearing experiences for all wearers. Wearers who find the one-size glasses uncomfortable tend to choose not to wear the glasses at all, putting themselves under threat of injury.

It is also known to construct glasses having a thicker and softer nose pad that is removable from the frame. Refer to FIG. 7, a fixing seat 50 is set on the arch 41 below the frame 40. On the fixing seat 50 there stand a few insertion posts 51 in horizontal position. A soft nose pad 60 forms the shape of n. At both ends of the bridge 61 are thick and solid pads 62. At the front side of the pad 62 are insertion holes 63 that fit with the insertion posts 51 for fixing the soft nose pad 60 to the frame 40. The heretofore known glasses of such construction reveal the following disadvantages:

1. The soft nose pad is attached to the frame in horizontal direction, which does not securely fix the nose pad to the glasses. In the event that the nose pad falls off, the insertion posts on the frame become dangerous to wearers and may cause serious injury to eyes or nose especially when wearers accidentally bump against the glasses.
2. Although the nose pad is made of soft material, it does not allow wearers to adjust the distance between these two sides of the pad and thus is unable to achieve desired comfort for wearers.

The present invention improves on the heretofore known glasses by providing a nose pad structure that is adjustable to fit different sizes and shapes of nose in wearers.

SUMMARY OF THE INVENTION

It is therefore a primary object of the invention to provide a nose pad for glasses which has a fixing seat set on the arch below the frame. Insertion posts are set with one end fastened onto the fixing seat and the other end connecting to the nose pad. The insertion posts are bent downwardly and vertically to connect to the nose pad. A soft nose pad in Ω shape has a thick arched member at both ends, with each arched member having an upper projection and a lower projection at the outer, lateral sides. A vertical through hole is in the upper projection, and a positioning groove is on the lower projection, with its opening facing upward. The insertion posts connect the fixing seat to the nose pad by passing the vertical through hole in the upper projection and fastening into the positioning groove in the lower projection. The distance between the upper projection and the lower projection, as well as the angle formed between these two sides of the arched member, can be freely adjusted to achieve wearing comfort.

BRIEF DESCRIPTION OF THE DRAWINGS

FIG. 3 is a lateral view of a nose pad in accordance with the present invention;

FIG. 4-A is a perspective view of a nose pad taken from upside, showing that the nose pad is adjustable;

FIG. 4-B is a view similar to FIG. 4-B showing that the distance between two sides of the nose pad has shortened after the adjustment;

DESCRIPTION OF THE PREFERRED EMBODIMENT

Figure 1:
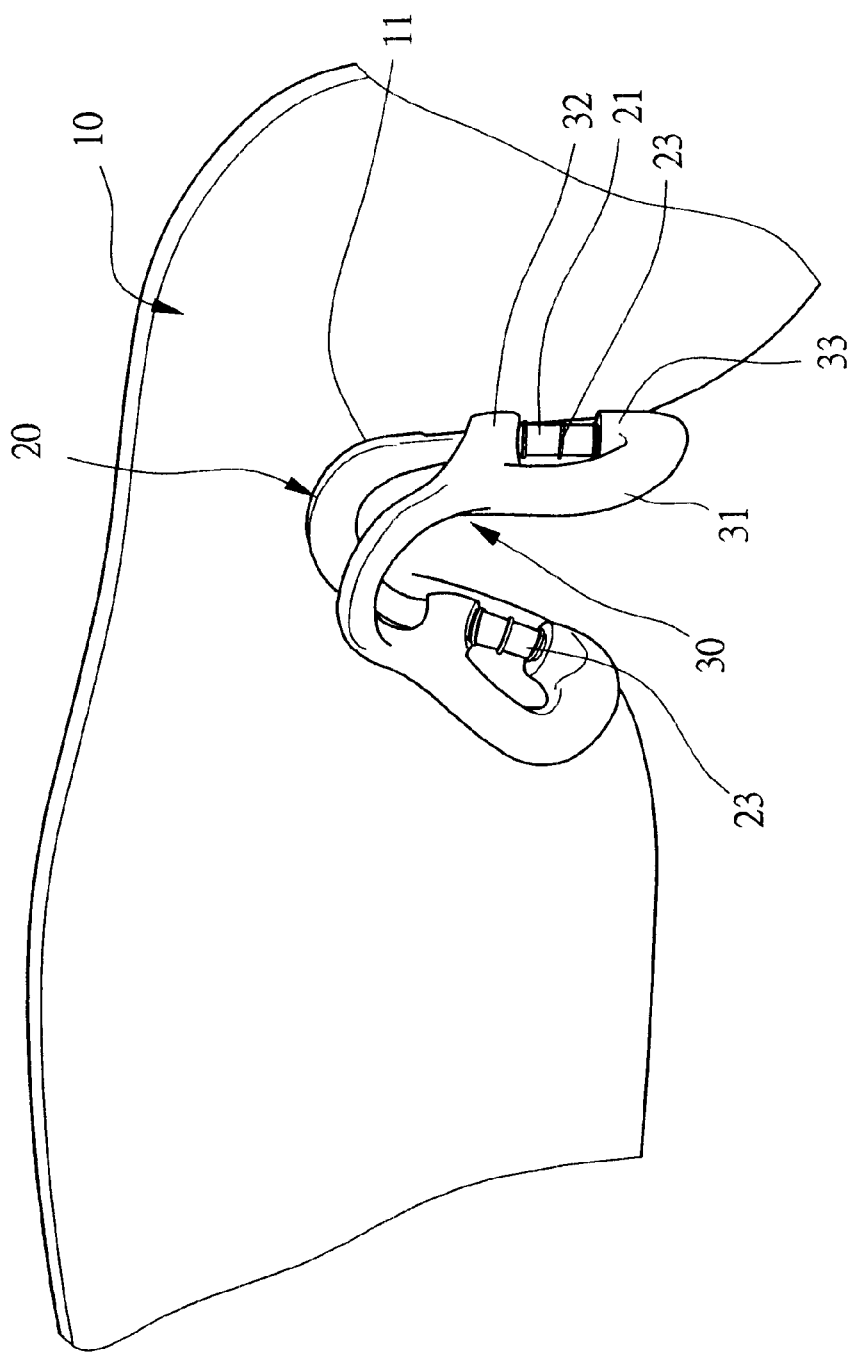
FIG. 1 is a front elevational view of a nose pad constructed in accordance with the present invention.
Figure 2:
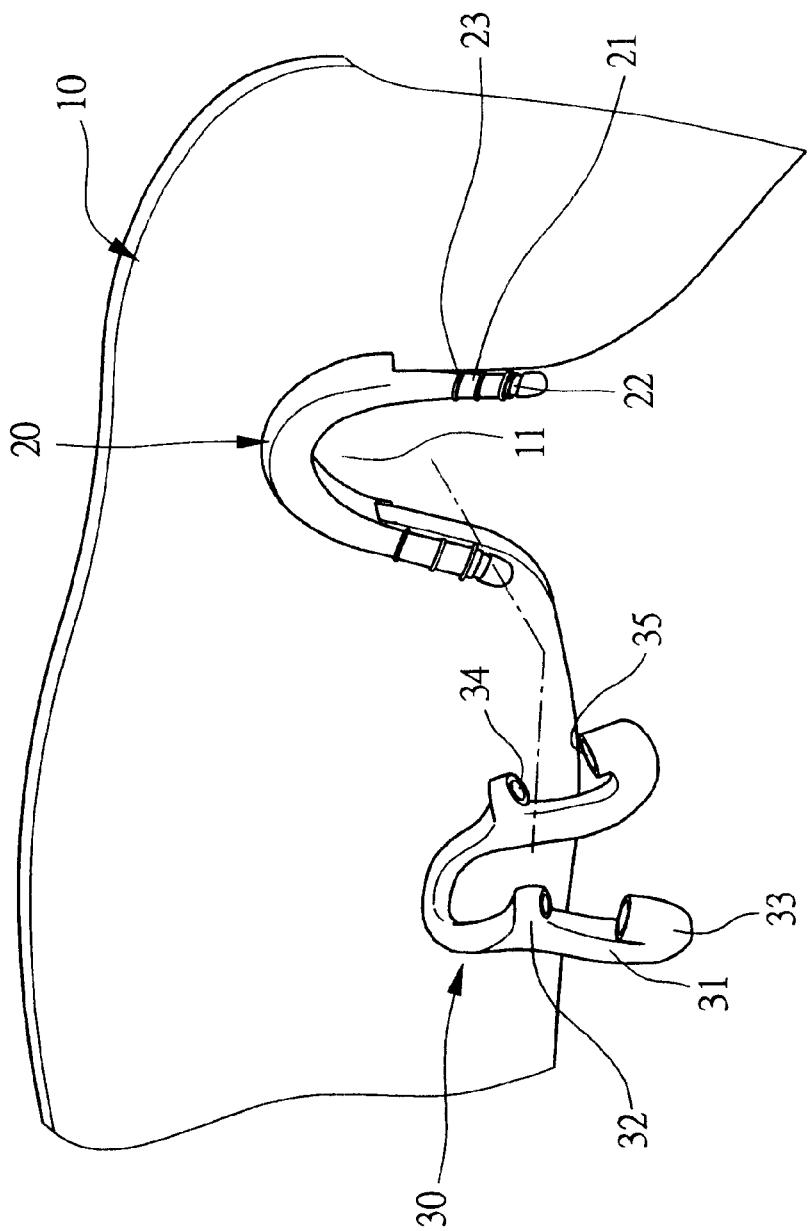
FIG. 2 is an explosive view of a nose pad in accordance with the present invention.

Referring to FIG. 1, FIG. 2, FIGS. 4-A & 4-B, the present invention comprises a frame 10, a fixing seat 20 installed on the arch 11 below the frame 10, and insertion posts 21 standing on the fixing seat 20 to connect to the nose pad 30. The insertion posts 21 on the fixing seat 20 are bent downwardly and in nearly vertical direction to form a reversed V shape. A number of anti-slipping members 23 are set on the middle of the insertion posts 21, and an annular groove 22 is set near the end of the insertion posts 21.

Figure 5:
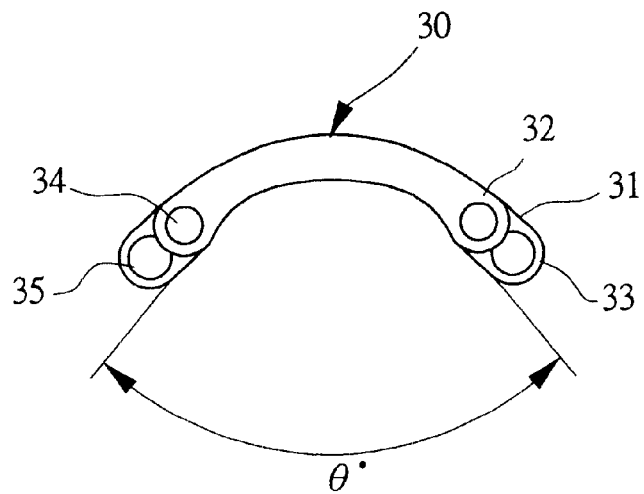
FIG. 5 is a top plan view of the present invention showing the angle θ.
Figure 6:
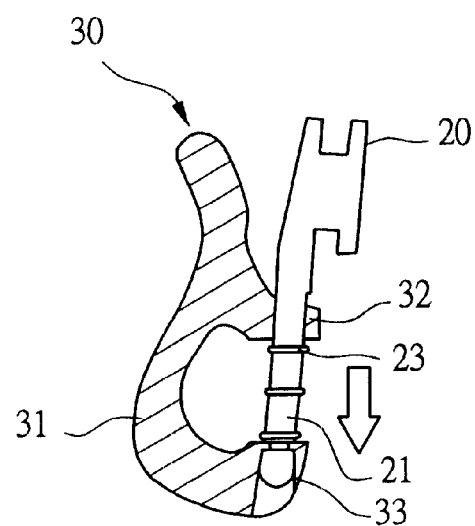
FIG. 6 is a lateral view of the present invention showing that insertion posts go through the upper projection and fasten onto the lower projection.
Figure 7:
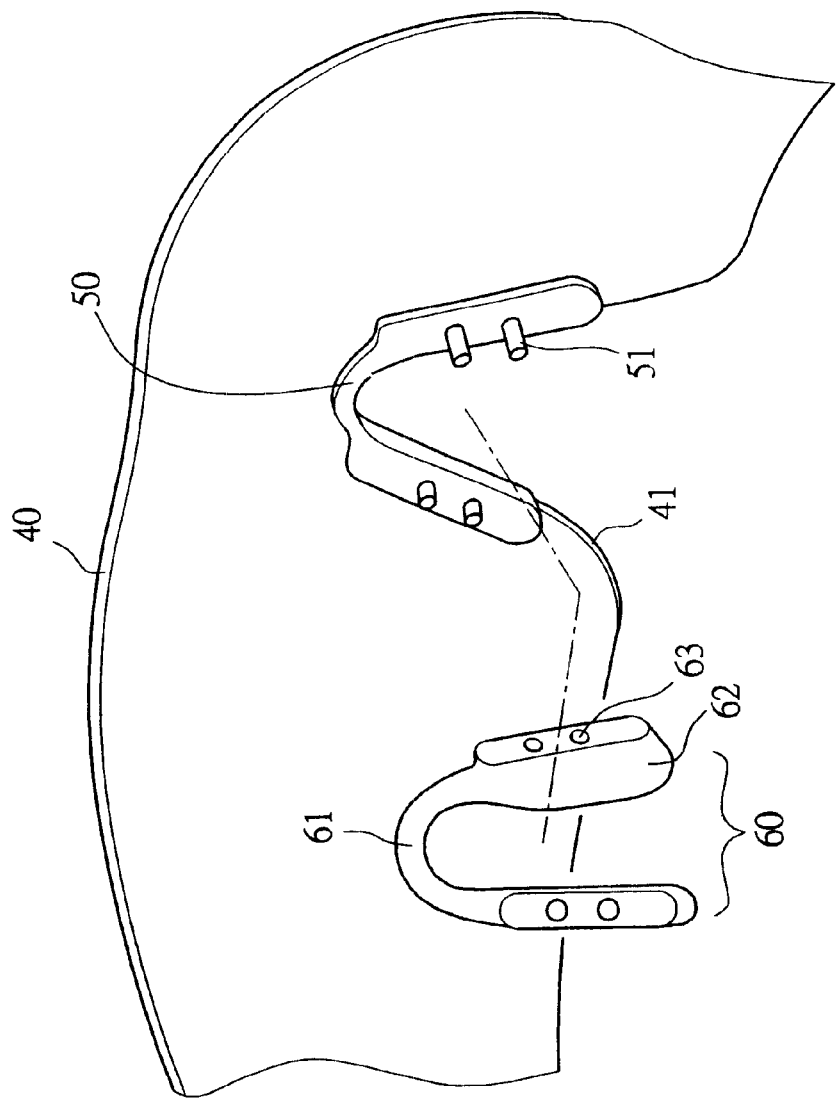
FIG. 7 is a fragmentary elevational view of a prior art showing that the nose pads attaches to the arch of the frame in horizontal direction.

Refer to FIG. 2 and FIG. 6, a nose pad 30 in the shape of Ω forms an arched member 31 with relatively thick padding at each side. At the outer, lateral side of each arched member 31 set an upper projection 32 and a lower projection 33. A vertical through hole 34 is in the upper projection 32, and a positioning groove 35 sits in the lower projection 33, forming a double radius hole. Refer to FIG. 2 and FIG. 5, the arched members 31 and the upper and lower projections 32, 33 form an angle θ. θ can vary between 90 and 145 degrees, while 120 degrees is the most desirable angle.

Refer to FIG. 2 and FIG. 6, the upper projection 32 and the lower projection 33 are for the insertion posts 21 to connect between the fixing seat 20 and the nose pad 30. The insertion posts 21 pass through the vertical through hole 34 in the upper projection 32 and fasten on to the lower projection 33 by fitting the annular groove 22 to the positioning groove 35 with double radius. To adjust the vertical level of the nose pad 30, as can be seen in FIG. 3, push the upper projection 32 on the nose pad 30 upwardly along the insertion posts 21. The anti-slipping member 23 provides great friction on the surface of the insertion posts 21 to ensure a better fixing effect. As can be seen in FIGS. 4-A & 4-B, with the insertion post 21 as the axis, the arched members 31 can be turned outwards or inwards to change the angle so as to accommodate different sizes and shapes of noses of wearers.

With the special designs, the present invention has the following advantages:

1. The insertion posts on the fixing seat are bent downwards in nearly vertical direction and thus do not cause danger to faces.

2. A pair of projection is positioned on outer, lateral sides of the nose pad, allowing wearers to adjust the vertical level of the nose pad, as well as the angle between two arched members to fit different shapes of noses. The enhanced comfort with wearing the glasses ensures safety in the working environment.

3. The annular grooves and anti-slipping members on the insertion posts provides a better effect of adjustment.

While a preferred embodiment of the invention has been shown and described in detail, it will be readily understood and appreciated that numerous omissions, changes and additions may be made without departing from the spirit and scope of the invention.

What is claimed is:

1. A nose pad for glasses comprising a fixing seat set on an arch below a frame, insertion posts with one end fastened onto said fixing seat and the other end connecting to a nose pad, wherein the improvement is characterized by:

said insertion posts are bent downwardly and vertically by side view;

said nose pad in Ω shape has a thick arched member at both ends, with each arched member having an upper projection and a lower projection at the outer, lateral sides;

a vertical through hole is disposed in said upper projection, and a positioning groove is arranged on said lower projection, with its opening facing upward;

wherein said insertion posts connect said fixing seat to said nose pad by inserting said vertical through hole through said upper projection and fastening into said positioning groove in the lower projection.

2. A nose pad for glasses as claimed in claim 1, wherein an annular groove is disposed at the end of said insertion posts, said positioning groove in the lower projection is double radius hole; said insertion posts fasten onto said lower projection by fitting said annular groove to said positioning groove.

3. A nose pad for glasses as claimed in claim 1, wherein a number of anti-slipping members are set on the middle of said insertion posts.

4. A nose pad for glasses as claimed in claim 1, wherein said insertion posts on the fixing seat are bent downwardly and in nearly vertical direction to form a reversed V shape.

5. A nose pad for glasses as claimed in claim 1, wherein said arched members form an angle with the upper and lower projections respectively, said angle is between 90 and 145 degrees.

* * * * *